May 19, 1970     S. SZAJERSKI     3,513,392
HIGH VOLTAGE PROBE WITH POSITIVE CONTACT INDICATOR
Filed Nov. 1, 1967
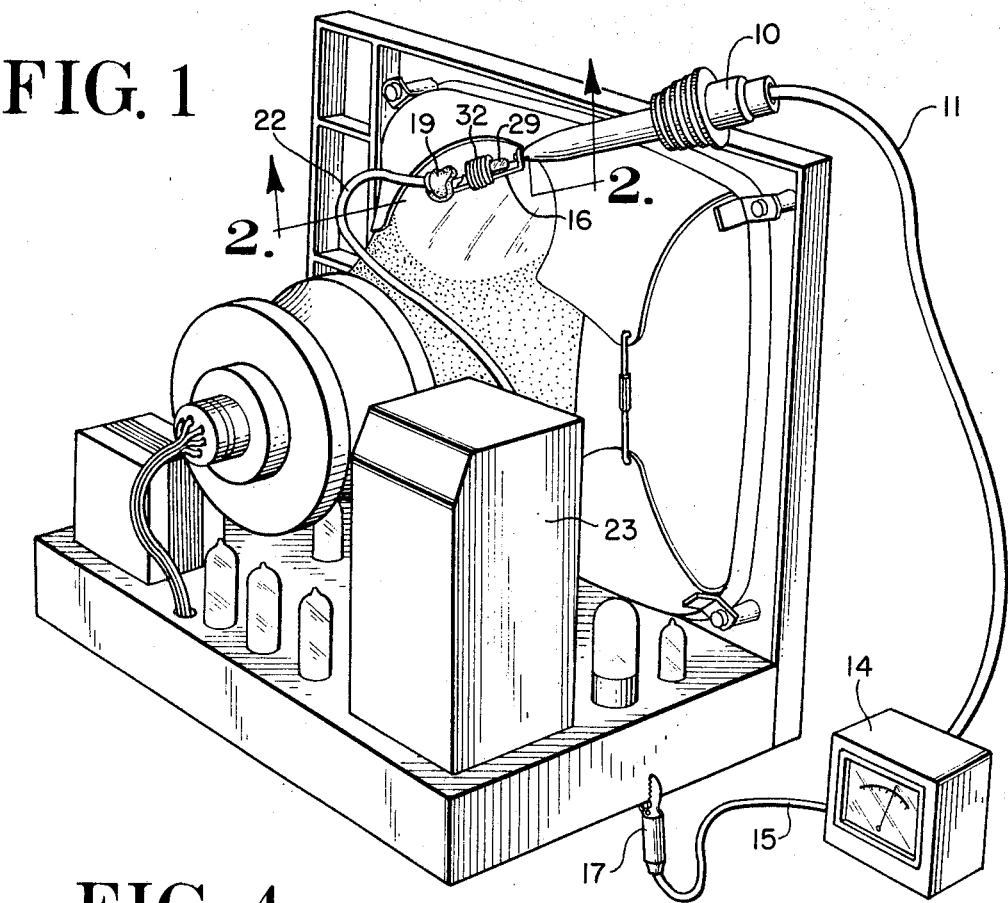
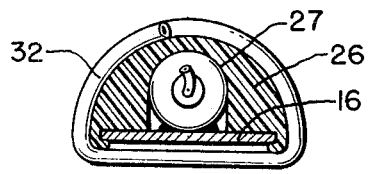
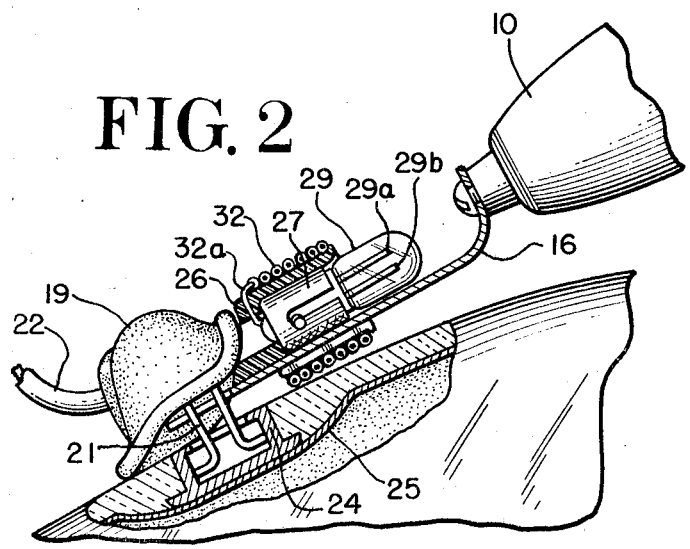
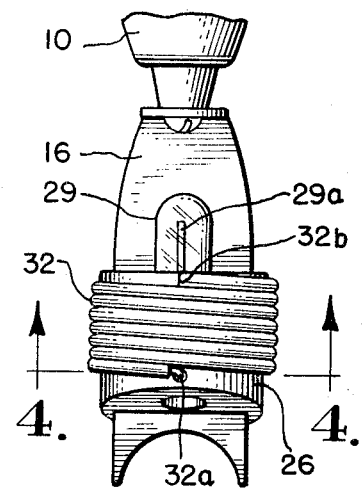
INVENTOR.
Sylvester Szajerski
BY
Attorney United States Patent Office 3,513,392
Patented May 19, 1970

3,513,392
HIGH VOLTAGE PROBE WITH POSITIVE CONTACT INDICATOR
Sylvester Szajerski, Chicago, Ill., assignor to Zenith Radio Corporation, Chicago, Ill., a corporation of Delaware
Filed Nov. 1, 1967, Ser. No. 679,688
Int. Cl. G01r 1/06, 13/36
U.S. Cl. 324—122     9 Claims

ABSTRACT OF THE DISCLOSURE

The presence of a good electrical connection between the tip of a high voltage probe and the high potential terminal of a voltage source to be measured is effectively determined by sensing the existence of any arcing between the probe tip and terminal, which would occur if the probe tip and terminal are slightly spaced apart and fail to physically mate. Arc detection is achieved by ionizing a gas tube in response to the radiated electromagnetic field of such arcing, thereby providing a visual indication that a faulty connection exists between the tip and terminal.

---

This invention pertains to a novel high voltage probe which effectively tests the quality status of its connection to a high voltage terminal and indicates the test results so that the operator will be apprised of the presence or absence of a positive contact between the probe and terminal. The invention is particularly useful to insure an accurate measurement of the high voltage applied to the second anode of the picture tube of a television receiver, and will be described in that environment.

Unlesss a good electrical connection, with very little or no resistance, is made between the tip of a high voltage probe and a high potential terminal, a correct measurement of the voltage at that terminal will not be obtained by the voltmeter to which the probe is connected. If the tip and terminal are not in physical contact and a gap exists therebetween the high voltage on the terminal arcs across the gap to the probe tip and effectively completes a circuit between the terminal and voltmeter. A voltmeter reading is obtained but will be false due to the voltage drop that will occur between the tip and terminal. The operator may, however, not realize that the voltage measurement is inaccurate since he may be unaware that a slight separation exists between the terminal and probe tip.

Unfortunately, this mistake often times occurs when the operator attempts to measure the high voltage at the terminal connector of the lead supplying the high voltage to the picture tube of a television receiver. The connector usually takes the form of a spring clip that snaps into, and is retained by, a metallic cavity cup or "button" molded into the enlarged or flared end of the picture tube. To bring the probe tip in physical contact with the terminal clip, the tip must be inserted between the picture tube and a rubber suction cup or cap that customarily covers the terminal clip. Under those circumstances, a faulty voltage reading may result since the probe tip may only be close to, and not touch, the terminal; and this may not be known to the operator inasmuch as a visual observation of the connection may not be possible because of the presence of the rubber cup.

An erroneous high voltage measurement for a color picture tube could result in a misadjustment of the associated high voltage power supply. A faulty connection between the probe and terminal clip effects a voltmeter reading below that which is actually present at the terminal clip. If the operator is not apprised of the faulty connection, he will adjust the power supply to increase the meter reading to the normal required level for proper operation of the color television receiver, but in reality the high voltage will now be substantially higher than that required and this may have a deleterious effect on the performance of the receiver.

This problem has now been solved and overcome by the present invention. A relatively simple and economical sensing arrangement is incorporated into a voltage probe to provide a telltale sign anytime a positive contact is not made at the connection of the probe tip to a high potential terminal.

Accordingly, it is an object of the present invention to provide a new and improved high voltage probe.

It is another object of the invention to provide a high voltage probe for detecting the absence of a good electrical connection between its probe tip and a high potential terminal, and indicating that fact to the operator.

It is a furher object to provide a high voltage probe that minimizes faulty connections to a voltage source to be measured.

The invention provides, in accordance with one of its aspects, a high voltage probe for connecting the high potential terminal of a voltage source to a voltmeter to facilitate a voltage measurement of the source. It comprises a conductive probe tip for physically engaging the high potential terminal to establish a positive electrical connection therebetween and achieve an accurate voltage measurement. A high resistance connection is established between the probe tip and terminal, resulting in a false measurement, when and if there is a slight separation and consequent arcing therebetween. There are also means including a gas tube, such as a neon lamp, for responding to the radiated electromagnetic field of any arc that develops between the probe tip and terminal to detect the absence of a positive contact therebetween. The gas tube ionizes, and thus illuminates to provide a visual indication anytime there is a faulty connection between the probe tip and terminal.

The features of this invention which are believed to be new are set forth with particularity in the appended claims. The invention, together with further objects and advantages thereof, may best be understood, however, by reference to the following description in conjunction with the accompanying drawing in which:

FIG. 1 discloses a high voltage probe, constructed in accordance with one embodiment of the invention, a television receiver chassis and a voltmeter, and illustrates the manner in which the probe is employed to test the high voltage applied to the picture tube of the receiver;

FIG. 2 is a sectional view of portions of the high voltage probe and the picture tube; and FIGS. 3 and 4 are additional views of the probe.

The television receiver shown in FIG. 1 may be of either monochrome or color type. The high voltage probe of the invention lends itself to voltage measurements of either type television set and, for that matter, may be utilized to test the voltage of any high voltage source within or without the field of television.

Turning now to a description of the structural details of the high voltage probe shown in FIGS. 1-4, the probe includes a handle 10 made of a suitable insulating material and through which a conductive lead 11 extends in order to complete an electrical connection from one terminal of a voltmeter 14 to the probe tip 16 of the high voltage probe. The other terminal of meter 14 is connected to the television chassis via a conductor 15 and a terminating alligator clip 17. Tip 16 is constructed of an appropriate conductive metal and, with the exception of its portion anchored to the remainder of the high voltage probe, takes the form of a flat strip to simplify the task of inserting or sliding the probe tip under the rubber suction cup 19 that covers the metallic spring clip 21 that terminates the lead 22 connected to the output of the high voltage power supply 23 of the television receiver. Terminal clip 21 electrically connects to and is held by the metallic cavity cup 24 of the picture tube. The cup in turn is electrically connected to the second anode electrode of the picture tube by means of conductive coating 25.

As thus far described the voltage probe is of generally conventional construction, with the possible exception of the flat probe tip which usually is pointed or cone-shaped. If handle 10 is appropriately positioned by the operator so that the free end of probe tip 16 physically engages high potential terminal 21 and thus establishes a positive connection thereto, the voltage at that terminal will be accurately measured by voltmeter 14. In the event, however, that the probe tip does not actually touch terminal 21 but is slightly spaced apart therefrom, as in the case shown in FIG. 2, arcing develops between terminal 21 and tip 16. A high resistance connection thus prevails between those elements with the result that a false reading is obtained by voltmeter 14. In accordance with the present invention, the absence of a positive contact between terminal 21 and tip 16 is detected by sensing the existence of any arcing between those elements and energizing an indicator when an arc is found to exist.

To fully explain, a coil form and support member 26, constructed of a suitable insulating material, is mounted on and affixed to probe tip 16. A tube or lamp metallic socket 27 is held between support 26 and tip 16. Socket 27 is electrically connected to tip 16, such as by soldering as seen in FIG. 4. A gas tube 29 is inserted in and held by socket 27. Preferably, the tube is a neon lamp but it can take a variety of different forms and may include any one of many different gases, such as argon or helium. A pick-up element is electrically connected to gas tube 29. In the illustrated embodiment, the pick-up element constitutes an inductance coil 32 that is wrapped around both support member 26 and probe tip 16. Neon lamp 29 has two electrodes 29a, 29b one of which is connected to socket 27 (via the base of the lamp) and hence to probe tip 16, while the other electrode is connected to the terminal end 32a of coil 32. The other end terminal 32b of the coil is unconnected. With this arrangement, probe tip 16 effectively constitutes an extension of one of the electrodes of gas tube 29 and pick-up element 32 constitutes an extension of the other electrode.

In operation of the invention, any arc or spark radiates an electromagnetic field. It acts as a transmitter and radiates energy over a wide portion of the frequency spectrum. Gas tube 29 is actually located close enough to the free end of probe tip 16, where the arcing occurs, to be ionized by the radiated electromagnetic field itself, in which case the gas tube would glow or illuminate to signal the presence of an arc and thus signal the absence of a positive contact. Pick-up element 32 is consequently not really necessary in carrying out the invention. To enhance the ionization and increase the level of illumination, however, the inclusion of coil 32 is preferred in order that an energizing or ionizing voltage be produced for application to the gas tube. Coil 32 effectively functions as an antenna and responds to the radiated field of any arcing between terminal 21 and probe tip 16 to generate a voltage. The presence of pick-up coil 32 insures that the smallest arc will be detected.

As a consequence, gas tube 29 ionizes, and thus illuminates, to provide a visual indication any time there is a faulty connection between tip 16 and terminal 21. The operator may then reposition handle 10 to move probe tip 16 toward and in engagement with high potential terminal 21, at which time neon lamp 29 extinguishes. A non-illuminated neon lamp, at a time when voltmeter 14 displays a high voltage reading, informs the operator that a positive contact prevails between probe tip 16 and terminal 21.

Of course, if a pick-up element is utilized and is located in the vicinity of the radiated field, gas tube 29 may be relatively remotely located; for example, it may be mounted and recessed within handle 10 at any point where it may be conveniently viewed by the operator.

Moreover, the pick-up element need not take the form of a coil as shown in the illustrated embodiment. For example, it may merely constitute another flat metallic strip that is supported on, but insulated from, probe tip 16 in the area between the gas tube and the free end of the probe tip. With that variation, the two electrodes of tube 29 are effectively extended to the source of radiation, namely to the space in which the arcing occurs.

The invention provides, therefore, an improved high voltage probe that includes a testing device for checking the quality of the connection made to a high voltage source in order to assist the operator in establishing a positive contact, thus precluding the possibility of obtaining an inaccurate voltage measurement that would otherwise occur in the event of a faulty, high resistance connection.

While a particular embodiment of the invention has been shown and described, modifications may be made, and it is intended in the appended claims to cover all such modifications as may fall within the true spirit and scope of the invention.

I claim:

1. A high voltage probe for connecting the high potential terminal of a voltage source to a voltmeter to facilitate a voltage measurement of the source, comprising:
   a conductive probe tip for physically engaging the high potential terminal to establish a positive electrical connection therebetween and achieve an accurate voltage measurement,
   a high resistance connection being established between the probe tip and terminal, resulting in a false measurement, when and if there is a slight separation and consequent arcing therebetween;
   and means including a gas tube mounted on and supported by said probe tip for responding to the radiated electromagnetic field of any arc that develops between the probe tip and terminal to detect the absence of a positive contact therebetween,
   said gas tube ionizing, and thus illuminating, to provide a visual indication anytime there is a faulty connection between the probe tip and terminal.

2. A high voltage probe according to claim 1 in which said gas tube is a neon lamp.

3. A high voltage probe according to claim 1 in which said probe tip is a flat metallic strip.

4. A high voltage probe according to claim 1 in which said gas tube is located sufficiently close to any arc between the probe tip and high potential terminal to be ionized by the electromagnetic field itself.

5. A high voltage probe according to claim 1 in which said means also includes a pick-up element for developing, in response to the radiated electromagnetic field, an energizing voltage for application to said gas tube to effect ionization thereof.

6. A high voltage probe according to claim 5 in which said pick-up element is an inductance coil.

7. A high voltage probe according to claim 5 in which said gas tube has two electrodes one of which is connected to said probe tip while the other is connected to a terminal of said pick-up element.

8. A high voltage probe according to claim 7 in which said pick-up element is capacitively coupled to said probe tip.

9. A high voltage probe according to claim 7 in which said probe tip effectively constitutes an extension of said one electrode of said gas tube and said pick-up element effectively constitutes an extension of said other electrode.

(References on following page)

References Cited

UNITED STATES PATENTS

| | | | |
|---|---|---|---|
| 1,814,399 | 7/1931 | Meissner et al. | 340—253 XR |
| 3,328,690 | 6/1967 | Lockie et al. | 324—95 XR |
| 3,337,801 | 8/1967 | Rinier et al. | 324—72.5 XR |
| 3,369,175 | 2/1968 | Morris | 324—72.5 XR |

GERARD R. STRECKER, Primary Examiner

E. F. KARLSEN, Assistant Examiner

U.S. Cl. X.R.

324—72.5, 149